(12) United States Patent
Okubo

(10) Patent No.: US 6,715,793 B2
(45) Date of Patent: Apr. 6, 2004

(54) THROUGH ANCHOR

(75) Inventor: Shinichi Okubo, Niwa-gun (JP)

(73) Assignee: Kabushiki Kaisha Tokai-Rika-Denki Seisakusho

( * ) Notice: Subject to any disclaimer, the term of this patent is extended or adjusted under 35 U.S.C. 154(b) by 13 days.

(21) Appl. No.: 10/183,053

(22) Filed: Jun. 27, 2002

(65) Prior Publication Data

US 2003/0020271 A1 Jan. 30, 2003

(30) Foreign Application Priority Data

Jun. 28, 2001 (JP) ......................................... 2001-196896

(51) Int. Cl.⁷ ............................................. B60R 22/24
(52) U.S. Cl. .................... 280/808; 280/801.1; 297/483; 24/197
(58) Field of Search ................. 24/163 R, 197, 24/265 BC; 297/463.1, 482, 483, 486; 242/615.3; 280/808, 801.1

(56) References Cited

U.S. PATENT DOCUMENTS

| | | | | |
|---|---|---|---|---|
| 3,959,855 A | * | 6/1976 | Fisher | 24/163 FC |
| 4,023,826 A | * | 5/1977 | Kokubo et al. | 297/483 |
| 4,211,432 A | * | 7/1980 | Furukawa et al. | 280/808 |
| 4,480,853 A | * | 11/1984 | Ando et al. | 280/801.1 |
| 4,527,313 A | * | 7/1985 | Sylven et al. | 24/464 |
| 5,513,880 A | * | 5/1996 | Ohira et al. | 280/808 |
| 5,516,148 A | * | 5/1996 | Ohira | 280/808 |
| 6,138,328 A | * | 10/2000 | Iseki | 24/197 |
| 6,267,410 B1 | * | 7/2001 | Koketsu et al. | 280/801.1 |
| 6,315,328 B1 | * | 11/2001 | Iseki et al. | 280/808 |
| 6,324,730 B1 | * | 12/2001 | Iseki | 24/197 |
| 6,491,347 B2 | * | 12/2002 | Iseki | 297/463.1 |
| 6,533,322 B2 | * | 3/2003 | Janz | 280/808 |

FOREIGN PATENT DOCUMENTS

JP 54-59635 5/1979

* cited by examiner

Primary Examiner—Charles T. Jordan
Assistant Examiner—Bret Hayes
(74) Attorney, Agent, or Firm—Nixon Peabody, LLP

(57) ABSTRACT

A through anchor includes: a through anchor body that includes a through hole, through which the webbing belt passes, and a support, which is molded using a metal mold and forms part of an inner peripheral surface of the through hole, with a parting line produced during molding being formed on or near the support in the inner periphery of the through hole; and a low-friction member that passes through the through hole and is adhered onto the support, the low-friction member including modified portions and first and second ends in the direction in which the low-friction member passes through the through hole. By aligning the modified portions with the parting line when the low-friction member is passed through the through hole and adhered to the support, the length of the low-friction member at either side of the parting line is proportionally the same.

17 Claims, 4 Drawing Sheets

THROUGH ANCHOR

BACKGROUND OF THE INVENTION

1. Field of the Invention

The present invention relates to a through anchor used in a vehicle seat belt device.

2. Description of the Related Art

A webbing belt is a component in a seat belt device for restraining the body of an occupant seated in a vehicle seat. The webbing belt includes two ends in the longitudinal direction, one of which is anchored to a spool of a take-up device attached to, for example, the side of the seat, and the other being fixed to an anchor plate disposed near the take-up device. The webbing belt passes through a through hole formed in a through anchor disposed above the take-up device (e.g., at an upper side of a center pillar of the vehicle) and is folded downward at the longitudinal-direction central portion thereof.

The webbing belt also passes through a through hole formed in a tongue plate between the through anchor and the anchor plate. The webbing belt is pulled out from the take-up device by pulling the tongue plate, and is fastened by engaging the tongue plate with a buckle device disposed at the side of the seat opposite to the side at which the take-up device is disposed. In this manner, the body of the occupant is restrained by the webbing belt.

The through anchor includes a core metal in which a base opening of a through hole is formed. The core metal is covered entirely with a synthetic resin material, except for a portion used to attach the core metal to the vehicle center pillar. An inner peripheral surface of the base opening is also covered with the synthetic resin. The webbing belt thus contacts and slides on the synthetic resin material.

When the webbing belt slides on the synthetic resin material, friction is generated between the webbing belt and an inner peripheral surface of the hole formed in the through anchor. The friction is preferably as small as possible, in view of the ease with which the webbing belt can be pulled out when the occupant fastens the webbing belt around the occupant's body or when the webbing belt is pulled out by the occupant's body suddenly moving forward due to inertial force when the vehicle undergoes sudden and rapid deceleration.

To reduce the friction between the webbing belt and the synthetic resin material and improve the ease with which the webbing belt can be pulled out, a resin film is attached to the inner peripheral surface of the through hole in the through anchor. The frictional resistance of the surface of the resin film with respect to the webbing belt is smaller than the frictional resistance of the inner peripheral surface of the through hole with respect to the webbing belt.

The resin film is basically manually attached by a worker, but it is not easy to attach the resin film to an appropriate position on the through anchor. This is because the through hole of the through anchor is a very narrow and long slit extending along the width direction of the webbing belt, and it is difficult for the worker to determine the length of the resin film on the side opposite from the worker when the resin film is passed through the through hole.

SUMMARY OF THE INVENTION

In view of the aforementioned facts, an object of the present invention is to provide a through anchor in which a low-friction member, e.g. a resin film, can be attached to an appropriate position.

A first aspect of the invention is a through anchor comprising: a through anchor body that includes a through hole, through which the webbing belt passes, and a support, which is molded using a metal mold and forms part of an inner peripheral surface of the through hole, with a parting line produced during molding being formed on or near the support in the inner periphery of the through hole; and a low-friction member that passes through the through hole and is adhered onto the support, the low-friction member including modified portions and first and second ends in the direction in which the low-friction member passes through the through hole, wherein, by aligning the modified portions with the parting line when the low-friction member is passed through the through hole and adhered to the support, the length of the low-friction member in the passing direction from the parting line to the first end and the length of the low-friction member in the passing direction from the parting line to the second end are in a specific proportion.

In the invention of the first aspect, when the webbing belt slides on the low-friction member, frictional resistance of the surface of the low-friction member with respect to the webbing belt is smaller than frictional resistance of the support with respect to the webbing belt.

In the through anchor having the above structure, after the webbing belt passes through the through hole, the longitudinal-direction central portion of the webbing belt is supported by the support, which is formed as a part of the inner peripheral surface of the through hole.

In the through anchor of the present invention, the support is covered with a low-friction member adhering thereon and basically is not exposed. The frictional resistance of the surface of the low-friction member with respect to the webbing belt is smaller than the frictional resistance of the inner peripheral surface with respect to the webbing belt. The low-friction member therefore enables the webbing belt to be pulled out and taken up more smoothly.

The through anchor of the present invention is molded using a metal mold. The molding produces a parting line on or near the support of the inner peripheral surface of the through hole.

The low-friction member includes modified portions. At the time of adhering the low-friction member onto the support, by having the modified portions aligned with the parting line, the proportion of the length of one end side and the length of the other end side of the low-friction member from the central portion of the low-friction member in the direction in which it passes through the through hole is specifically determined.

In this manner, by adhering the low-friction member onto the support with the modified portions aligned with the parting line, the position of the low-friction member relative to the through anchor body can be easily determined.

Still in the first aspect, the low-friction member includes a main body that is adhered onto the support, and at least one fixing piece adhered at a predetermined position on the through anchor body, wherein the at least one fixing piece extends from an outer periphery of the main body and a dimension of the fixing piece in a direction orthogonal to both the thickness direction of the fixing piece and the direction in which the fixing piece extends from the main body is smaller than a dimension of the main body in the orthogonal direction.

In the through anchor having the above structure, the low-friction member is attached onto the through anchor body such that the main body of the low-friction member is fixed onto the support and the fixing pieces extending from the main body are fixed to the through anchor body at positions other than that of the support.

If the low-friction member is to be attached on a curved surface of the through anchor body, a portion of the low-friction member must be curved in the width or longitudinal direction thereof in accordance with the curvature of the curved surface of the through anchor body.

However, if the dimension of the low-friction member is longer than the adhesion surface of the through anchor body in the curved direction thereof, the low-friction member may wrinkle or be lifted partially from the adhering position, and it is not easy to curve the low-friction member in accordance with the curvature of the curved surface of the through anchor body. Therefore, the low-friction member may sometimes fail to be reliably fixed.

In the through anchor of the present invention, a dimension of the fixing piece in a direction orthogonal to both the thickness direction of the fixing piece and the direction in which the fixing piece extends from the main body is smaller than a dimension of the main body in the orthogonal direction. Hence, even if the fixing piece is to be attached onto a curved surface, adhesion can be accomplished without greatly curving the fixing piece. Accordingly, the fixing piece can be reliably fixed onto the through anchor body.

Further, in the first aspect, the through anchor body includes a groove formed at a position other than the position at which the support is disposed, a portion of an outer periphery of the low-friction member is inserted into the groove and is fixed to a portion of an inner periphery of the groove, and a width of the groove in a thickness direction of the through anchor body is shorter than a length, in the direction of insertion, of the portion of the low-friction member inserted into the groove.

In the through anchor having the above structure, a portion of the outer periphery of the low-friction member, which is attached onto the support, is inserted into the groove formed in the through anchor at a position other than that of the support, and is fixed to a portion of the inner peripheral surface of the groove.

Note that the dimension of the portion inserted into the groove of the low-friction member in the direction perpendicular to the width direction thereof is larger than the dimension of the opening of the groove in the direction perpendicular to the width direction of the inserted portion. With this arrangement, even if the inserted portion of the low-friction member separates from the inner peripheral surface of the groove and is going to come out from the groove, a surface opposite the surface onto which the inserted portion is fixed prevents the inserted portion from slipping out of the groove.

A second aspect of the invention is a low-friction member comprising: a main body that includes first and second ends and is adhered onto a component; at least one fixing piece that extends from the first end and/or the second end and is fixed at a predetermined position on the component; and a modified portions, wherein the low-friction member includes a central portion between the first and second ends, and when the low-friction member is adhered, the modified portions are disposed at positions where the length from the central portion to the first end and the length from the central portion to the second end are in a specific proportion, and a dimension of the at least one fixing piece in the direction orthogonal to both the thickness direction of the fixing piece and the direction in which the fixing piece extends from the main body is smaller than a dimension of the main body in the orthogonal direction.

DESCRIPTION OF THE PREFERRED EMBODIMENTS

First Embodiment

Figure 1:
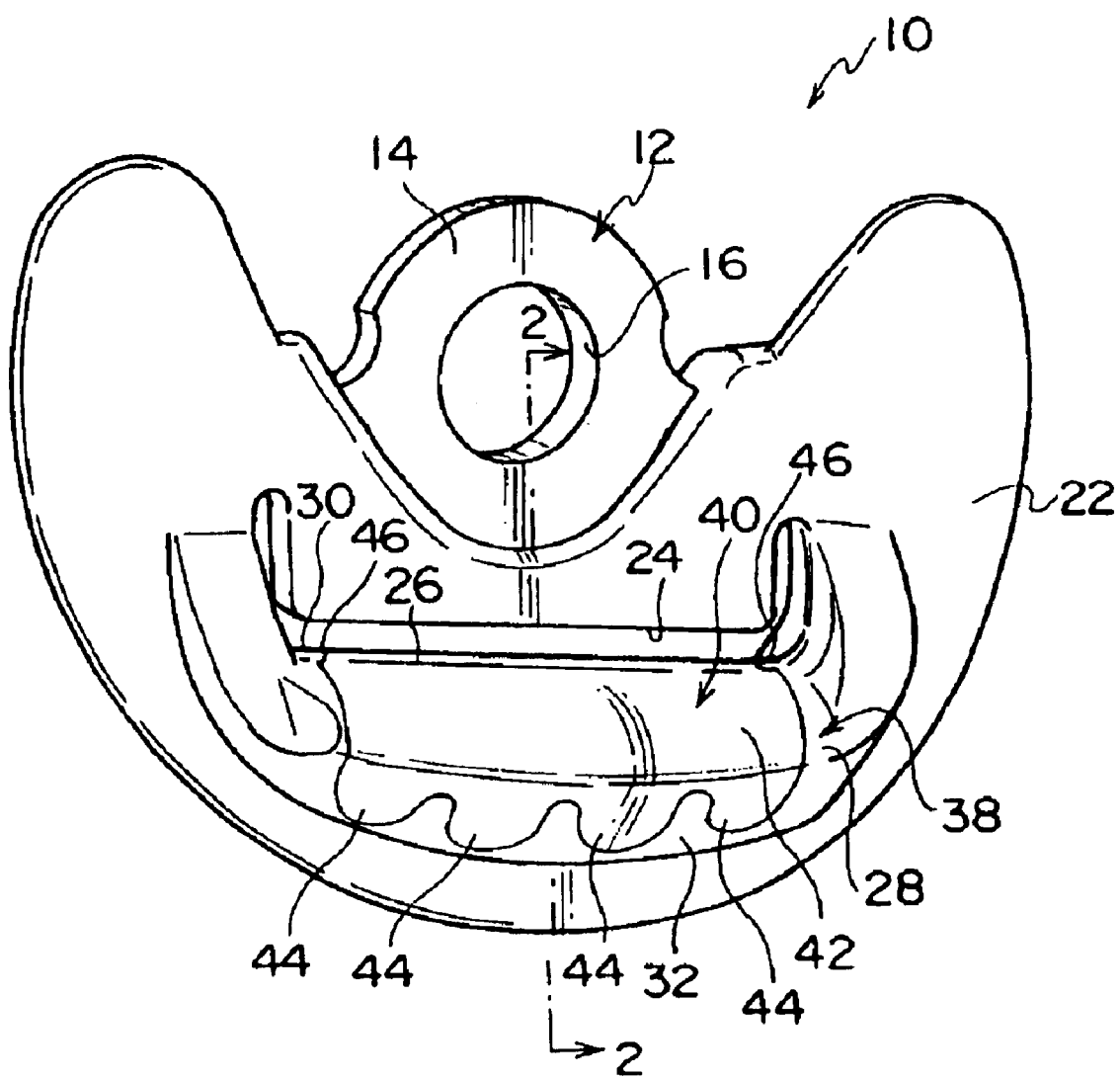
FIG. 1 is a perspective view illustrating a through anchor relating to a first embodiment of the present invention.
Figure 2:
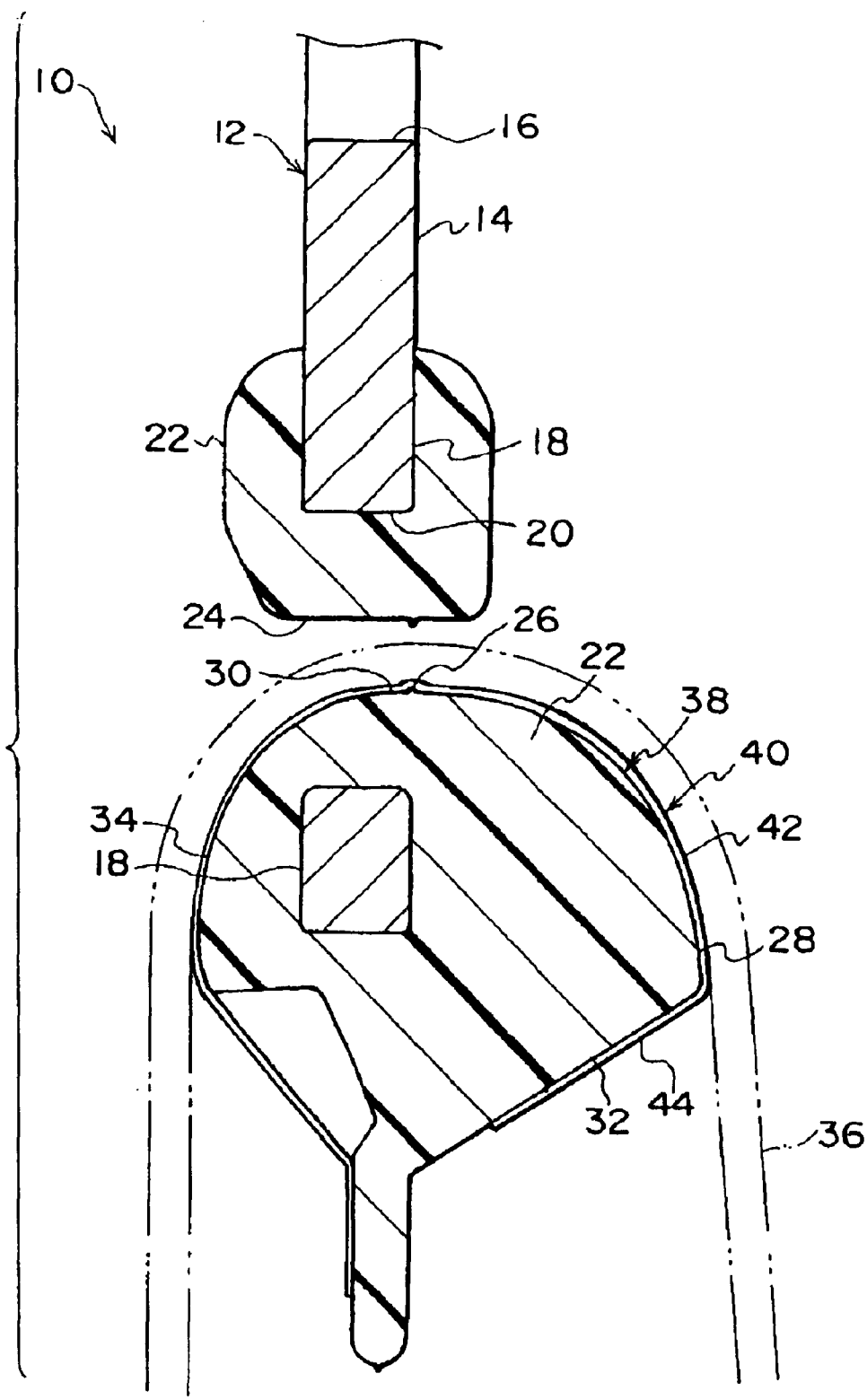
FIG. 2 is a cross-sectional view of the through anchor of FIG. 1 along section line 2—2.

FIG. 1 is a perspective view of a through anchor 10 relating to a first embodiment of the present invention, and FIG. 2 is a cross-sectional view of the through anchor 10 of FIG. 1 along section line 2—2.

As shown in FIGS. 1 and 2, the through anchor 10 has a core metal 12, which forms a through anchor body and is formed in a substantially plate-like shape. The core metal 12 includes a mount 14. The mount 14 includes a hole 16 that passes through the mount 14 in the thickness direction thereof. The through anchor 10 is mounted on the vehicle with a bolt (not shown). The bolt is inserted through the hole 16 and secured to a vehicle center pillar or a slider, which forms a height-adjusting device disposed on the center pillar.

As shown in FIG. 2, a core metal body 18 is formed at an end of the mount 14. The core metal body 18 is wider than the mount 14, and includes a base opening 20 which penetrates the core metal body 18 in the thickness direction thereof.

The core metal body 18 includes a molded portion 22, which is formed by casting a melted synthetic resin material. Specifically, the molded portion 22 is formed by pouring the synthetic resin material into cavities provided in a pair of molds opposing each other in the thickness direction of the core metal 12, with a portion of the core metal 12 (i.e., the core metal body 18) being placed in the cavities. That is, the molded portion 22 is formed at both sides of the core metal body 18 in the thickness direction thereof (i.e., at left and right sides of the core metal body 18 in FIG. 2). The molded portion 22 is formed in a substantial crescent-shape, with the portion in the vicinity of the hole 16 curving inward when seen in front view (see FIG. 1).

The molded portion 22 includes a through hole 24 formed at the inner peripheral side of the base opening 20. Specifically, the through hole 24 is formed by covering the inner periphery of the base opening 20 with the synthetic resin material that forms the molded portion 22.

The through hole 24 is a comparatively narrow slit that penetrates (as the base opening 20 does) the metal core 12 in the thickness direction thereof. The through hole 24 includes ends that bend in a substantially right angle toward the hole 16, so that the through hole 24 has a substantial U-shape that opens toward the hole 16 when seen in front view.

Because the molded portion 22 is cast as described above, a parting line 26 is produced at a parting line of the molds used for molding the molded portion 22. The parting line 26 extends along a substantial center of a lower inner periphery 30 of the through hole 24 in a direction orthogonal to the thickness direction of the molded portion 22.

A jaw-shaped portion 28, which serves as a support for a webbing belt 36, is formed in the molded portion 22 at one side of the core metal body 18 in the thickness direction thereof. The jaw-shaped portion 28 has a substantial U-shape that opens toward the hole 16 when seen in front view, and is formed along the lower inner periphery 30 positioned at the side of the through hole 24 opposite to the side disposed near the hole 16.

An upper side than the central area of the jaw-shaped portion 28 (i.e., the side near the through hole 24), relative to the width direction (i.e., the vertical direction in FIG. 1) of the through hole 24, smoothly curves along the lower inner periphery 30. A lower side (i.e., the side disposed further away from the through hole 24) of the jaw-shaped portion 28 is formed as an adhesion surface 32. The adhesion surface 32 slopes toward the side opposite the hole 16. The adhesion surface 32 also curves outward, along the thickness direction of the core metal 12, at a predetermined curvature toward the side opposite the hole 16.

A jaw-shaped portion 34, which also serves as a support for the webbing belt 36, is formed in the molded portion 22 at the other side of the core metal body 18 in the thickness direction thereof. An upper side than the central area of the jaw-shaped portion 34, relative to the width direction of the through hole 24, smoothly curves along the lower inner periphery 30.

The webbing belt 36, which is a component of a vehicle seat belt device, is passed through the through hole 24 and is flexible in the width direction thereof. A longitudinal-direction base end of the webbing belt 36 is anchored to a spool (not shown) of a webbing take-up device, which is another component of the seat belt device. When not in use, most of the webbing belt 36 is taken up onto the spool of the take-up device and stored thereon. To fasten the webbing belt 36, the vehicle occupant pulls the webbing belt 36 to thereby pull out the part of the webbing belt 36 wound around the spool of the take-up device.

As described before, the through anchor 10 is secured to the vehicle center pillar or the slider. Accordingly, the webbing belt 36 passes through the through hole 24 of the through anchor 10 and is supported in a curved manner by a support 38, which is formed by the lower inner periphery 30 and the jaw-shaped portions 28 and 34.

A resin film 40, which is a low-friction member, is adhered on the support 38 and the adhesion surface 32. A fixing material or substance, such as an adhesive, is applied on the underside of the resin film 40. The resin film 40 is integrally fixed to a desired position with the adhesive force of the fixing substance by attaching the coated underside of the resin film 40 to the surface of the support 38. Frictional resistance (i.e., the coefficient of friction) of the surface of the resin film 40 with respect to the underside of the webbing belt 36 (i.e., the side of the webbing belt 36 facing the support 38) is smaller than frictional resistance of the surface of the support 38 with respect to the webbing belt 36.

The resin film 40 includes a film body 42, which is a low-friction member body. The film body 42 is adhered on the surface of the support 38. Therefore, when the webbing belt 36 is pulled out from or taken up on the spool of the take-up device, the underside of the webbing 36 belt slides on the surface of the film body 42.

Fixing pieces 44, which are disposed intermittently along the width direction of the webbing belt 36, extend from both ends of the film body 42 in the direction corresponding to the longitudinal direction of the webbing belt 36. The width (i.e., in the width direction of the webbing belt 36) of each fixing piece 44 is much smaller than the width (i.e., in the width direction of the webbing belt 36) of the film body 42. Ends of the fixing pieces 44 extending from the jaw-shaped portion 28 side of the film body 42 reach and are integrally adhered to the adhesion surface 32 of the jaw-shaped portion 28.

The fixing pieces 44 extending from the jaw-shaped portion 34 side of the film body 42 are made to integrally adhere to the molded portion 22 at the side opposite the through hole 24 via the jaw-shaped portion 34.

A notch 46, which serves as a modified portion, is in each width-direction end of the film body 42 and at substantially the same positions along the longitudinal direction of the film body 42. As illustrated in FIGS. 1 and 2, the notches 46 are aligned with the parting line 26 when the resin film 40 is adhered to the predetermined position on the support 38.

Next, operation and effects of the present embodiment will be described.

As described above, the through anchor 10 is secured to the center pillar or the slider in a vehicle by a bolt (not shown) inserted through the hole 16. The webbing belt 36 passes through the through hole 24 and is supported by the through anchor 10.

By pulling the tongue plate, through which the webbing belt 36 passes, the part of the webbing belt 36 wound around the spool of the take-up device is pulled out, and the webbing belt is fastened around the body of the vehicle occupant by engaging the tongue plate in the buckle device.

When the webbing belt 36 is pulled out, the webbing belt 36 slides on the support 38. More precisely, the webbing belt 36 slides on the surface of the resin film 40 because the surface of the support 38 is coated with the resin film 40.

As mentioned above, frictional resistance (i.e., the coefficient of friction) of the surface of the resin film 40 with respect to the underside of the webbing belt 36 (i.e., the side of the webbing belt 36 facing the support 38) is smaller than frictional resistance of the surface of the support 38 with respect to the webbing belt 36. Accordingly, the webbing belt 36 can be pulled out and taken up more smoothly than the case in which the webbing 36 directly contacts and slides on the surface of the support 38.

When the webbing belt 36 slides on the surface of the resin film 40, the webbing belt 36 tends to draw the resin film 40 in the direction in which the webbing belt 36 slides due to the friction generated therebetween. However, because the fixing pieces 44 of the resin film 40 are fixed to the molded portion 22 at the side opposite the through hole 24 via the adhesion surface 32 and the jaw-shaped portion 34, the webbing belt 36 does not contact the distal end of the resin film 40 along the direction in which the webbing belt 36 slides (i.e., the ends of the fixing pieces 44). When the webbing belt 36 is pulled out or taken up, the webbing belt 36 does not interfere with the ends of the fixing pieces 44. Accordingly, even when the webbing belt slides on the film body 42, the fixing pieces do not separate from the molded portion 22. Thus, the resin film 40 remains fixed at the predetermined position.

In the present embodiment, the adhesion surface 32 is a curved surface that axially curves at the predetermined curvature, with the thickness direction of the core metal 12 being the axial direction, and projects toward the side opposite the hole 16. However, the width (i.e., in the width direction of the webbing belt 36) of each fixing piece 44 is much smaller than the width (i.e., in the width direction of the webbing belt 36) of the film body 42. Accordingly, no wrinkles or bumps are caused in the fixing pieces 44 when the fixing pieces 44 are attached on the curved adhesion surface 32. In this manner, the fixing pieces 44 reliably remain fixed to the adhesion surface 32 over a long period of time.

The resin film 40, which reduces friction between the support 38 and the webbing belt 36, is adhered on the through anchor 10 such that the notches 46 are aligned with the parting line 26 of the through anchor 10. Because the molded portion 22 is a molded resin product, the parting line 26 is always formed at substantially the same position. By aligning the notches 46 with the parting line 26, the resin film 40 can always be fixed at the same position (i.e., so that the length of the resin film 40 at either side of the parting line 26 is proportionally the same).

Second Embodiment

A second embodiment of the present invention will now be described. Components in the second embodiment that are substantially the same as those of the first embodiment will be identified by the same reference numerals and description thereof will be omitted.

Figure 3:
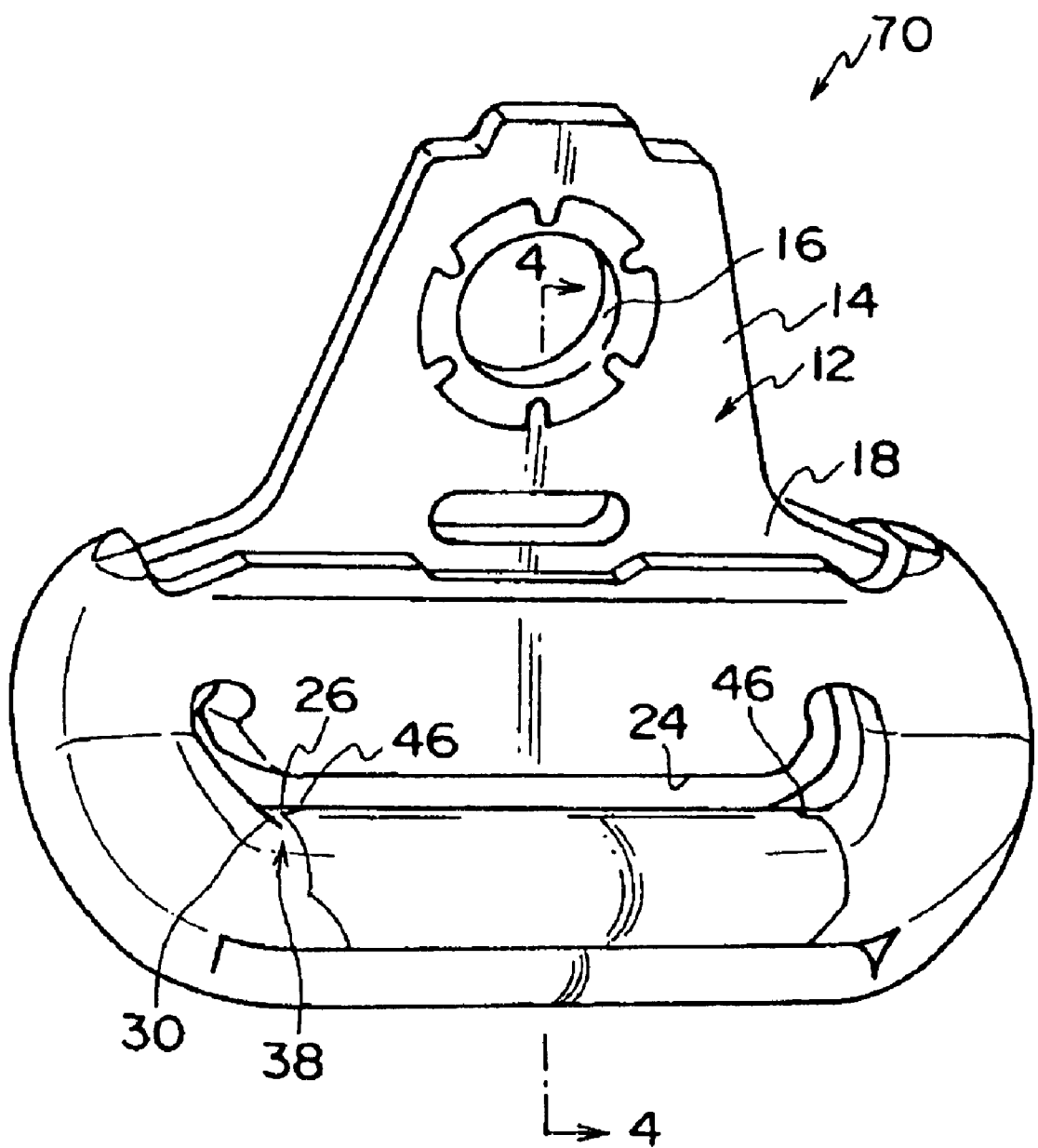
FIG. 3 is a perspective view illustrating a through anchor relating to a second embodiment of the invention.
Figure 4:
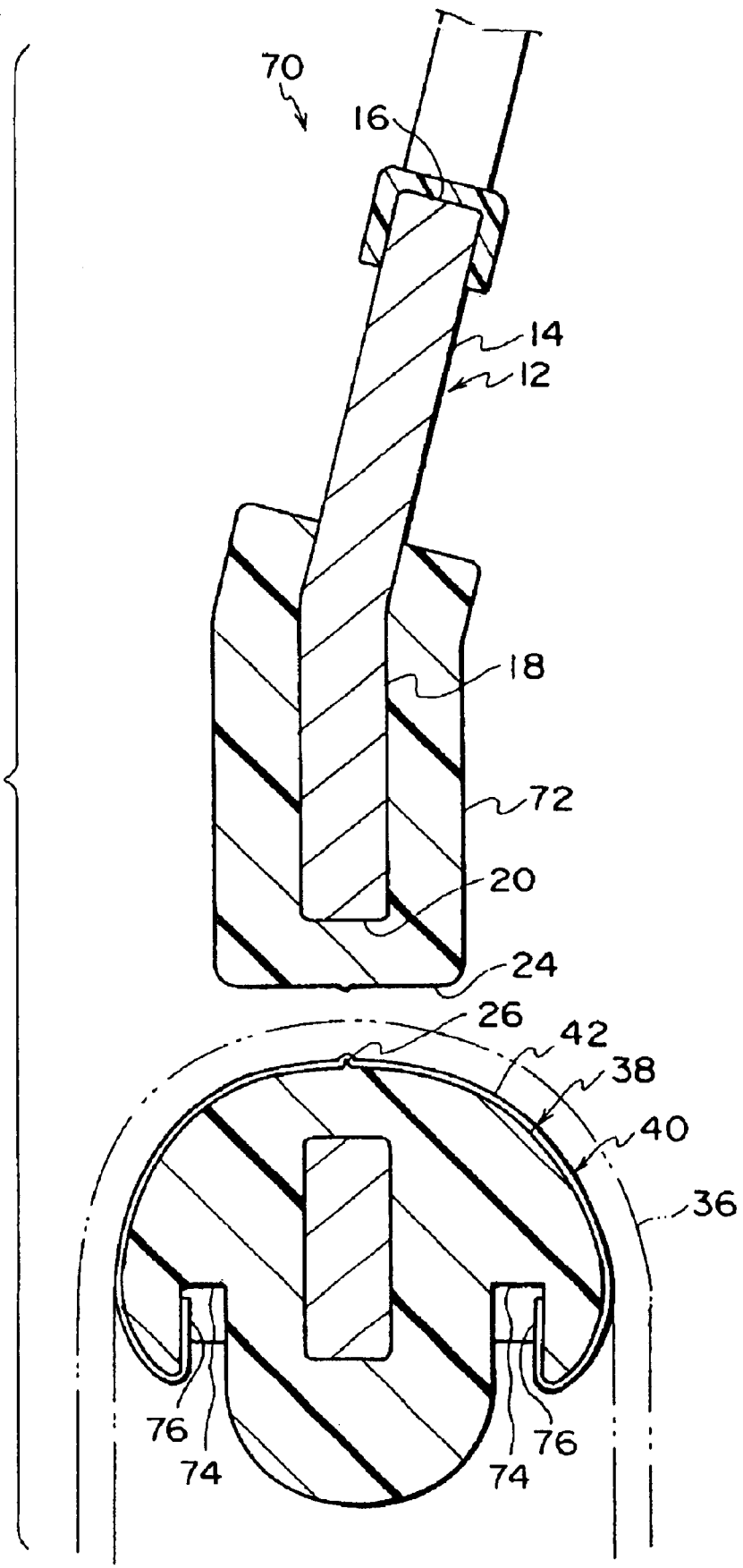
FIG. 4 is a cross-sectional view of the through anchor of FIG. 3 along section line 4—4.

FIG. 3 is a perspective view of a through anchor 70 relating to the second embodiment, and FIG. 4 is a cross-sectional view of the through anchor 70 of FIG. 3 along section line 4—4. As shown in FIGS. 3 and 4, the through anchor 70 includes a molded portion 72 which, together with the core metal 12, forms a through anchor body. Though the molded portion 72 does not include the jaw-shaped portions 28 and 34, it is a molded resin product substantially the same as the molded portion 22. The molded portion 72 includes a pair of grooves 74, which open toward the side of the molded portion 72 opposite the side disposed near the mount 14. Each groove 74 has a bottom and is a long slit extending along the width direction of the core metal 12. The grooves 74 are formed at both thickness-direction sides of the molding portion 72.

The resin film 40 includes extensions 76 rather than the fixing pieces 44. The extensions 76 extend from both ends (i.e., both ends in the direction in which the webbing belt 36 extends) of the film body 42.

Each extension 76 has substantially the same width as that of the film body 42, is folded around an outermost edge (in the thickness direction of the molded portion 72) of the groove 74, inserted inside the groove 74, and fixed to an inner surface of the groove 74. As seen in FIG. 4, the length of the extension 76 fixed to the inner surface of the groove 74 (i.e., length extending in the vertical direction of FIG. 4) is longer than the width (in the thickness direction of the molded portion 72) of the groove 74.

In the present embodiment, each extension 76 has substantially the same width as that of the film body 42. However, similar to the fixing pieces 44, the extensions 76 may be narrower than the film body 42. The extensions 76 may also be modified so that they do not interfere with ribs if ribs are disposed to prevent deformation caused during formation of the grooves 74.

In the through anchor 70, because the extensions 76 of the film body 42 enter the grooves 74, the webbing belt 36 does not interfere with the extension 76 when the webbing belt 36 slides on the film body 42. Thus, the extensions 76 do not separate from the inner wall of the groove 74 when the webbing belt 36 slides on the film body 42, and remain fixed at the predetermined position over a long period of time.

Further, the dimension of the part of the extension 76 that is inserted into the groove 74 is longer than the width of the groove 74. Therefore, even if the extension 76 separates from the inner surface of the groove 74 and elastically pivots around the outermost edge of the groove 74, the extension 76 abuts against the inner surface of the groove 74 opposite to the inner surface at which the extension 76 had been fixed, and does not inadvertently come out of the groove 74. Accordingly, even if the extension 76 separates from the groove 74, the webbing belt 36 does not interfere with the extension 76, and the resin film 40 remains fixed at the predetermined position.

In the present embodiment, the notches 46 are also formed in the film body 42 and aligned with the parting line 26. In this regard, the same operation and effects can be obtained as those of the first embodiment.

What is claimed is:

1. A through anchor that slidably supports a webbing belt, the through anchor comprising:
   a through anchor body that includes a through hole, through which the webbing belt passes, and a support, which is molded using a metal mold and forms part of an inner peripheral surface of the through hole, with a parting line produced during molding being formed on or near the support in the inner periphery of the through hole; and
   a low-friction member that passes through the through hole and is adhered onto the support, the low-friction member including modified portions positioned at a central portion of the film body along the longitudinal direction, and first and second ends in the direction in which the low-friction member passes through the through hole,
   wherein, by aligning the modified portions with the parting line when the low-friction member is passed through the through hole and adhered to the support, a length of the low-friction member in the passing direction from the parting line to the first end and a length of the low-friction member in the passing direction from the parting line to the second end are in a specific proportion.

2. The through anchor of claim 1, wherein the support is formed by molding at least a liquid or powder material in the metal mold.

3. The through anchor of claim 1, wherein, when the webbing belt contacts and slides on the low-friction member, frictional resistance of a surface of the low-friction member with respect to the webbing belt is smaller than frictional resistance of the support with respect to the webbing belt.

4. The through anchor of claim 1, wherein
   the through anchor body includes a groove formed at a position other than the position at which the support is disposed,
   a portion of an outer periphery of the low-friction member is inserted into the groove and is fixed to a portion of an inner periphery of the groove, and
   a width of the groove in a thickness direction of the through anchor body is shorter than a length, in the direction of insertion, of the portion of the low-friction member inserted into the groove.

5. The through anchor of claim 3, wherein the low-friction member includes
   a main body that is adhered onto the support, and
   at least one fixing piece adhered at a predetermined position on the through anchor body,
   wherein, the at least one fixing piece extends from an outer periphery of the main body and a dimension of the fixing piece and a direction orthogonal to both the thickness direction of the fixing piece and a direction in which the fixing piece extends from the main body is smaller than a dimension of the main body in said orthogonal direction.

6. The through anchor of claim 5, wherein
   the through anchor body includes a groove formed at a position other than the position at which the support is disposed, a portion of an outer periphery of the low-friction member is inserted into the groove and is fixed to a portion of an inner periphery of the groove, and a width of the groove in a thickness direction of the through anchor body is shorter than a length, in the direction of insertion, of the portion of the low-friction member inserted into the groove.

7. The through anchor of claim 5, wherein the support includes an adhesion portion that slopes in the direction in which the webbing belt passes through the through hole and a direction away from the through hole.

8. The through anchor of claim 7, wherein the modified portions are notches.

9. The through anchor of claim 7, wherein the low-friction member is sheet-shaped.

10. The through anchor of claim 7, wherein the through hole is a substantially U-shaped slit when seen in front view.

11. The through anchor of claim 7, wherein the low-friction member is formed from a resin film.

12. The through anchor of claim 7, wherein the though anchor is secured to a vehicle center pillar or a slider, which forms a height-adjusting device disposed on the center pillar.

13. A low-friction member comprising:

a main body that includes first and second ends and is adhered onto a component;

at least one fixing piece that extends from at least one of the first end and the second end and is fixed at a predetermined position on the component; and modified portions, wherein the low-friction member includes a central portion between the first and second ends, the modified portions being positioned at the central portion, and when the low-fiction member is adhered, the modified portions are disposed at positions where a length from the central portion to the first end and a length from the central portion to the second end are in a specific proportion, and wherein, a dimension of the at least one fixing piece in a direction orthogonal to both the thickness direction of the fixing piece and the direction in which the fixing piece extends from the main body is smaller than a dimension of the main body in said orthogonal direction.

14. The low-friction member of claim 13, wherein the component is a through anchor that slidably supports a webbing belt, includes a through hole at which a longitudinal-direction central portion of the webbing belt is supported, the low-friction member passes through the through hole, and is slidingly contacted by the webbing belt.

15. The low-friction member of claim 14, wherein, when the webbing belt contacts and slides on the low-friction member, frictional resistance of the low-friction member with respect to the webbing belt is smaller than frictional resistance of the through anchor with respect to the webbing belt.

16. The low-friction member of claim 15, wherein the low-friction member is formed from a resin film.

17. The low-friction member of claim 16, wherein the low-friction member is sheet-shaped.

* * * * *